(12) United States Patent
Yamamoto (10) Patent No.: US 7,752,763 B2
(45) Date of Patent: Jul. 13, 2010

(54) ELECTRIC DRILL

(76) Inventor: Kazuhiro Yamamoto, 2-19-15 Nakaikegami, Ota-ku, Tokyo (JP) 146-0081

( * ) Notice: Subject to any disclaimer, the term of this patent is extended or adjusted under 35 U.S.C. 154(b) by 0 days.

(21) Appl. No.: 12/635,744

(22) Filed: Dec. 11, 2009

(65) Prior Publication Data

US 2010/0092254 A1 Apr. 15, 2010

Related U.S. Application Data (63) Continuation of application No. 11/996,024, filed as application No. PCT/JP2006/307065 on Apr. 3, 2006, now Pat. No. 7,650,699.

(30) Foreign Application Priority Data

Jul. 22, 2005 (JP) ............... 2005-213236

(51) Int. Cl.
B23B 45/14 (2006.01)
(52) U.S. Cl. .............. 33/334; 33/638; 408/6; 340/689
(58) Field of Classification Search .......... 33/333, 33/334, 354, 366.11, 534, 638; 173/2; 340/689; 408/5, 6, 9, 710
See application file for complete search history.

(56) References Cited

U.S. PATENT DOCUMENTS

| | | | |
|---|---|---|---|
| 4,189,726 A | 2/1980 | Rosa et al. | |
| 4,546,549 A | 10/1985 | Duperon | |
| 5,401,124 A | 3/1995 | Hettich | |
| 6,111,515 A | 8/2000 | Schaer et al. | |
| 6,810,596 B2 | 11/2004 | Fung et al. | |
| 7,154,406 B1 | 12/2006 | Judge | |
| 7,182,148 B1 | 2/2007 | Szieff | |
| 7,331,113 B1 | 2/2008 | Patrick et al. | |
| 7,650,699 B2 * | 1/2010 | Yamamoto | ............. 33/334 |
| 2002/0133959 A1 | 9/2002 | Bone et al. | |
| 2003/0196824 A1 | 10/2003 | Gass et al. | |

(Continued)

FOREIGN PATENT DOCUMENTS

JP S56-48413 5/1981

(Continued)

OTHER PUBLICATIONS

International Search Report dated Jul. 4, 2006 for corresponding International Application No. PCT/JP2006/307065.

(Continued)

*Primary Examiner*—G. Bradley Bennett
(74) *Attorney, Agent, or Firm*—Katten Muchin Rosenman LLP

(57) ABSTRACT

An electric drill having a function for preventing drilling of unexpected oblique hole. Further in the electric drill, when the direction of drilling is displaced in drilling work using the electric drill, it is sensed automatically to stop the drilling. The electric drill (1) performs drilling in the direction perpendicular a workpiece (7) and have a tilt sensor (10) mounted on a tilt sensor mounting surface (8) defined in parallel to the ground surface. When the rotation axis (C) of the drill positioned perpendicular to the surface of the workpiece is tiled to an angle equal to or greater than a predetermined angle, the tilt sensor (10) senses the tilt shutoff a drive current of the electric drill.

7 Claims, 8 Drawing Sheets

U.S. PATENT DOCUMENTS

2004/0216314 A1 11/2004 Ch Fung et al.
2009/0165313 A1* 7/2009 Borinato ..................... 33/263

FOREIGN PATENT DOCUMENTS

| JP | H04-70414 | 6/1992 |
|---|---|---|
| JP | 4-223884 | 8/1992 |
| JP | 6506400 | 7/1994 |
| JP | 07-214408 | 8/1995 |
| JP | 8-215910 | 8/1996 |
| JP | H09-174462 | 7/1997 |
| JP | 10-225810 | 8/1998 |
| JP | 2000263304 | 9/2000 |
| JP | 2002-36136 | 2/2002 |
| JP | 2006-312224 | 11/2006 |

OTHER PUBLICATIONS

Notice of Reasons for Rejection dated Dec. 12, 2006 for corresponding Japanese Application No. 2006-521744.
Notice of Reasons for Rejection dated Mar. 6, 2007, for corresponding Japanese Application No. 2006-521744.

\* cited by examiner

INCLINATION NOT DETECTED

4 SWITCH    10 INCLINATION SENSOR
            (10x, 10y)

FIG. 3

INCLINATION DETECTED 4           10
            (10x, 10y)

ELECTRIC DRILL

CROSS-REFERENCE TO RELATED APPLICATION

This application is a continuation of U.S. patent application Ser. No. 11/996,024 filed on Jan. 17, 2008, now pending, which is a National Phase Application of International Application PCT/JP2006/307065 filed on Apr. 3, 2006, and which claims priority to Japanese Patent Application 2005-213236 filed on Jul. 22, 2005, the contents of which are herein incorporated by reference.

TECHNICAL FIELD

The present invention relates to an electric drill capable of drilling holes in a target material in a suitable direction.

BACKGROUND ART

In the back ground art of this technical field, the following are known as to an electric drill with a means for sensing a boring direction.

Publication 1: Japanese Patent Laid-open Publication No. Hei-7-214408 entitled as "Hand-type electric drill with level" (published on Aug. 15, 1995)

Publication 2: Japanese Patent Laid-open Publication No. Hei-10-225810 entitled as "Handy-type electric drill" (published on Aug. 15, 1998).

DISCLOSURE OF INVENTION

Problem to be solved by the Invention

Publications 1 and 2 describe portable electric drills with a level by which a worker is able to bore holes in a target material while the worker is visually confirming by the level whether or not the electric drill is located perpendicular to the target material.

However, according to Publications 1 and 2, when the worker bores holes in the target material in the vertical direction, the worker has to continue watching the level during boring holes. When the electric drill was tilted relative to the target material due to strength of force of the worker, then a problem arose, in which the electric drill continued to bore holes in the target material with an inclination until the worker stopped driving the electric drill.

That is, the electric drill in Publications 1 and 2 does not have a function to prevent the electric drill from boring unexpected oblique holes in the target material. Also, the descriptions of Publications fail to refer to such a function.

Means for solving the Problem

Accordingly, the present invention is to provide an electric drill having a function to prevent unexpected slanting holes from being bored in a target material.

Further, the present invention is to provide an electric drill which can cease boring holes when it automatically senses that a boring direction is offset when holes are bored by the electric drill.

Further, the present invention is to provide an electric drill which can resume boring holes when a boring direction is corrected, after the electric drill ceased boring holes due to misalignment of boring directions during a boring operation with the electric drill.

According to the objects of this invention, an electric drill for boring holes on a workpiece material in the vertical direction includes an inclination sensor mounted on an inclination sensor mount plane set parallel to the surface of the ground, wherein when a rotation axis of the drill positioned on the surface of the workpiece material in the vertical direction is tilted at an angle greater than a predetermined angle, the inclination sensor senses the inclination to interrupt a drive current of the electric drill.

The inclination sensor of the electric drill may be an inclination sensor for sensing an inclination and interrupting a drive current of the electric drill if the rotation axis of the drill that is perpendicularly positioned on the surface of the workpiece material is tilted at an angle greater than a predetermined angle in the X-axis direction or the Y-axis direction when holes are bored in the vertical direction, where a boring portion is set to an origin, axes which cross each other at the origin are prescribed as a Y axis in the upper direction of a workpiece surface, as an X axis in the right direction and as a Z axis in front of a worker along a boring direction on the surface of the workpiece material set in parallel to the surface of the ground.

The inclination sensor of the electric drill may be an inclination sensor for sensing an inclination and interrupting a drive current of the electric drill if the rotation axis of the drill that is perpendicularly positioned on the surface of the workpiece material is tilted at an angle greater than a predetermined angle in the Y-axis direction when holes are bored in the horizontal direction, where a boring portion is set to an origin, axes which cross each other at the origin are prescribed as a Y axis in the upper direction of a workpiece surface, as an X axis in the right direction and as a Z axis in front of a worker along a boring direction on the surface of the workpiece material set in the vertical direction.

The electric drill of this invention for boring holes in a workpiece material may include an inclination sensor located on an inclination sensor mount plane which inclination sensor mount plane is defined as a plane parallel to the surface of the ground within the electric drill, wherein the inclination sensor senses an inclination and interrupts the drill drive current when a rotation axis of the electric drill is tilted at an angle greater than a predetermined angle from a boring direction obtained at the start of boring holes.

The inclination sensor of the electric drill of this invention may again conduct the electric drill drive current to the electric drill when the rotation axis of the electric drill is again returned within an angle less than a predetermined angle after the rotation axis of the electric drill is tiled at an angle greater than a predetermined angle from a boring direction obtained at the start of boring holes.

The electric drill of this invention may further include an inclination sensor mount plate within the electric drill, wherein the inclination sensor mount plate can be held parallel to the surface of the ground at the start of boring holes.

The electric drill of this invention may further include a workpiece surface gradient setting dial, wherein the inclination sensor mount plane can be held parallel to the surface of the ground by the workpiece surface gradient setting dial at the start of boring holes.

The electric drill of this invention may further include means for rotating and fixing the inclination sensor mount plane and the inclination sensor at the start of boring holes.

Also, the electric drill of this invention for boring holes in a workpiece material in a perpendicular direction include an attitude angle detecting sensor set to the electric drill for detecting a posture angle of the electric drill, wherein the attitude angle detecting sensor senses an inclination and interrupts a drive current of the electric drill when an posture angle of the electric drill is tilted at an angle greater than a predetermined angle.

The attitude angle detecting sensor of the electric drill of this invention may be a motion sensor using more than one of a gyro, an acceleration sensor and a terrestrial magnetism sensor.

EFFECT OF INVENTION

According to the present invention, it is possible to provide an electric drill having a function to prevent unexpected slanting holes from being bored.

Further, according to the present invention, it is possible to provide an electric drill which can cease boring holes when it automatically senses that a boring direction is offset when holes are bored by the electric drill.

Further, according to present invention, it is possible to provide an electric drill which can resume boring holes when a boring direction is corrected, after the electric drill ceased boring holes due to misalignment of boring directions during a boring operation with the electric drill.

DESCRIPTION OF REFERENCE NUMERALS

1: electric drill, 2: drill body, 3: drill (edge of blade, tip), 4: switch portion, 5: grip portion, 6: chucking portion, 7: workpiece material, 8: inclination sensor mount plane, 8-1: inclination sensor mount plate, 10: inclination sensor, 10$x$: X-direction uniaxial inclination sensor, 10$y$: Y-direction uniaxial inclination sensor, 10$z$: Z-direction uniaxial inclination sensor, 10$xy$: XY direction biaxial inclination sensor, 11: commercially-available AC power supply plug, 12: gradient setting dial for surface of workpiece, M: motor of drill, C: drill rotation axis in the normal state, Ca: drill rotation axis when an electric drill is tilted, H: part of the workpiece surface 7 to be bored, h: intersection at which the inclination sensor mount plane intersects with the drill axis, θ angle formed between the workpiece material and the surface of the ground and a: angle formed between the surface of the workpiece material and the drill axis

BEST MODE FOR CARRYING OUT THE INVENTION

Embodiments according to the present invention will be described below in detail with reference to the attached drawings. Elements identical to those shown in the drawings are denoted by identical reference numerals and therefore need not be 10 described.

First, an electric drill with inclination sensor will be described generally or theoretically.

In the document of the present application, "holes" may include all processed shapes which are those processed by an electric drill, for example, a through hole (also referred to as a "through-hole"), a non-through hole ("blind hole", also referred to as a "blind-hole") and a concavity. Also, "electric drills" may include, in addition to general electric drills, motor-operated tools such as a vibration drill, a hammer drill and an air drill. A drive power supply may include a commercially-available power supply and a rechargeable power supply. Also, "drilling angles" may prescribe an angle formed between a center line of hole and the surface of the ground (not shown) or an angle formed between a drill rotation axis and the surface of the ground. Alternatively, the drilling angle may prescribe an angle formed between the center line of hole and the surface of the workpiece material or an angle formed between the drill rotation axis and the surface of the workpiece material. The drilling angles has to be clearly defined with reference to either the surface of the ground or the surface of the workpiece material.

Figure 1:
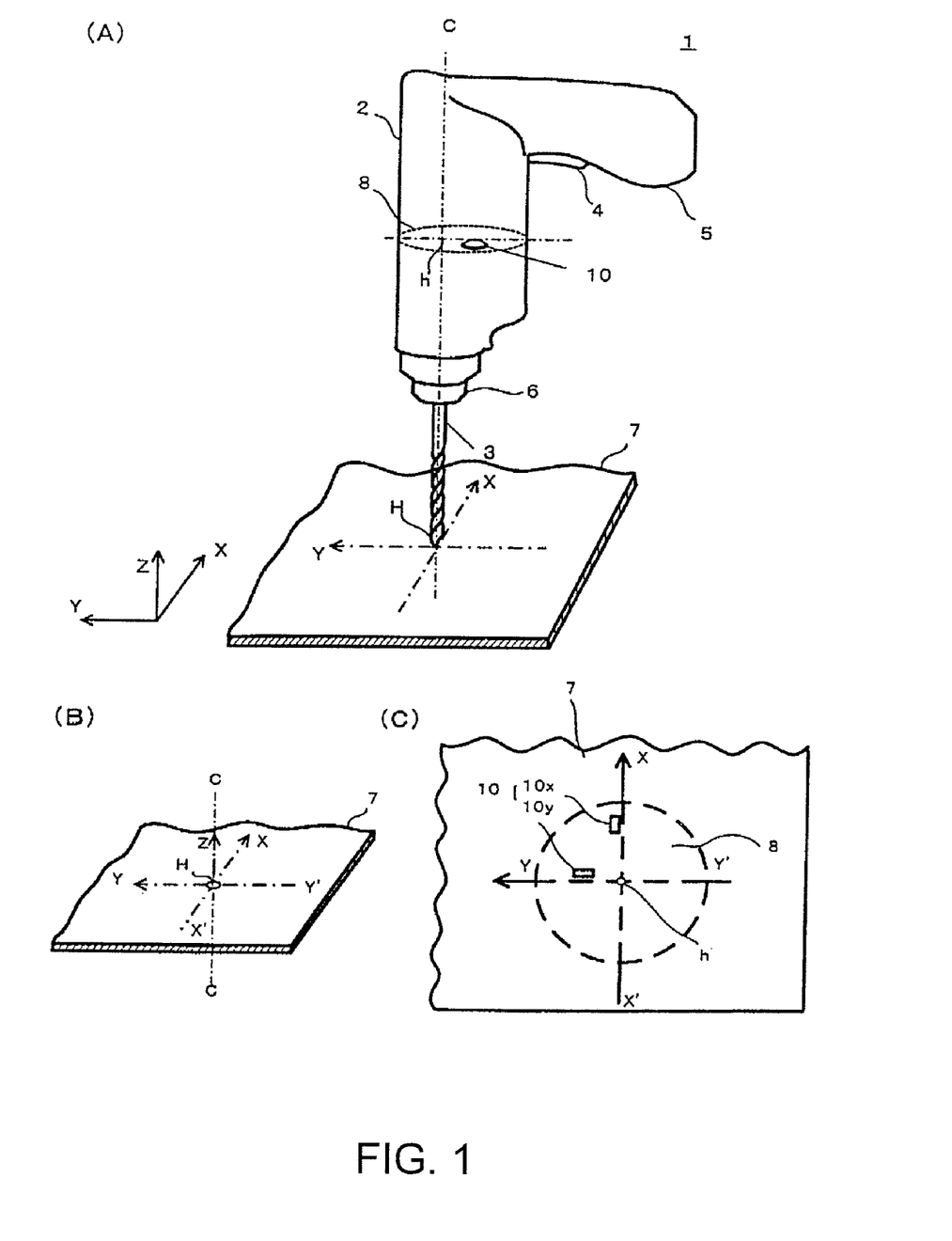
FIG. 1 is a diagram to explain a first embodiment in which holes are bored in the vertical direction by an electric drill.

FIG. 1(A) describes a situation in which a worker (not shown) on the right-hand side of the sheet of drawing is operating an electric drill 1. As illustrated, the electric drill 1 generally includes a drill body 2, a drill (also referred to as an edge of blade or a tip) 3, a chucking portion b for attaching the drill to the drill body, a grip portion 5 with which the worker holds the drill and a switch portion 4 for turning ON/OFF a drive power supply of a drill motor (not shown). Further, the electric drill 1 according to the embodiment of the present invention includes an inclination sensor 10. To readily understand the drawings, a cord of the drive power supply and the like are not shown.

Reference numeral 7 denotes a workpiece material such as a building, concrete and a brick. An angle formed by this workpiece material relative to the surface of the ground is determined as a 0 degree. In FIG. 1(A) the workpiece material 7 is placed in parallel to the surface of the ground, so that the θ is zero. A reference letter H denotes a place to be bored on the surface of the workpiece material 7. Also, a reference letter C denotes a boring direction (i.e. a direction in line with a center line of hole or a drill rotation axis).

To explain a positional relationship between the workpiece material 7 and the inclination sensor 10, as illustrated in FIG. 1 (B) in detail, the part H to be bored is defined as an origin, the Y axis of the X-Y Z coordinate is defined as an axis in the upper direction, the X axis of the X-Y Z coordinate is defined as an axis in the right-hand direction and the Z axis of the X-Y-Z coordinate is defined as the axis along the boring direction, as seen from the front side of the worker when the worker operates 25 the electric drill.

As shown in FIG. 1(A), in order to specify the position of the inclination sensor 10, a small mount plane 8 parallel to the surface of the ground is prescribed at the place to mount the inclination sensor, and an intersection point between the mount plane 8 of the inclination sensor and the drill axis C is prescribed as an h. The mount plane 8 of the inclination sensor may be an imaginary plane. It should be noted that the positions of the inclination sensor 10 and the mount plane 8 of the inclination sensor is not limited to the inside of the drill body portion 2 and that they may be located on the periphery of the drill body portion.

The inclination sensor 10 is also referred to as a clinometer and is a device capable of detecting a deviation between the direction of the gravity defined by a suspended weight or a liquid level and the mount plane 8 inclined relative to the horizontal plane. The inclination sensor 10 may be a commercially-available pendulum type clinometer, a liquid level clinometer and so on.

First embodiment

Boring Operation of Holes in a Floor and a Ceiling (Vertical Holes)

FIG. 1(A) is a diagram to explain a case in which holes are bored in a floor and a ceiling (vertical boring). To be concrete, this drawing describes an embodiment in which holes are bored in the workpiece material 7 located in parallel to the surface of the ground (i.e. at 6=zero) by the electric drill 1. At that time, the boring direction relative to the surface of the ground and the surface of the workpiece material 7 is an angle of 90 degrees.

In the case as shown in FIG. 1(A) in which holes are bored in the floor and the ceiling, the electric drill 1 is not tilted in the normal state and the inclination sensor 10 is held horizontally, so that the mount plane 8 of the inclination sensor is placed in parallel to the surface of the ground.

Figure 2:
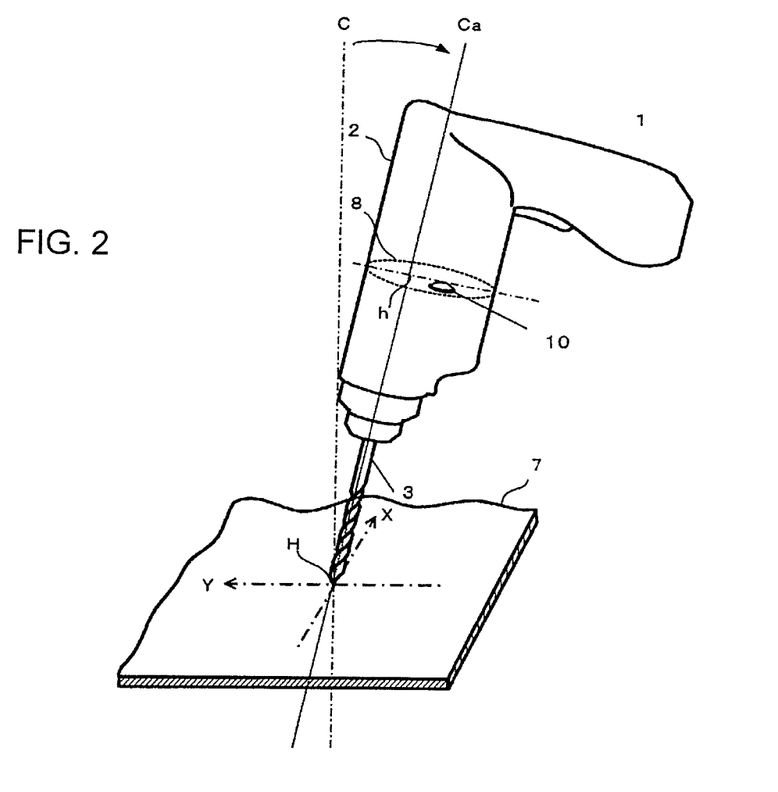
FIG. 2 is a diagram to explain a case in which an electric drill is tilted when holes are bored by the first embodiment of FIG. 1.

If the electric drill 1 is tilted and moved from the original drill rotation axis C to the inclined rotation axis Ca, as in FIG. 2, during boring operations of holes, then it is impossible to bore holes in a desired direction. When the electric drill is tilted, both the drill body 2 and the mount plane 8 of the inclination sensor are inclined relative to the surface of the ground in unison with each other, so that the inclination sensor 10 located on the mount plane 8 of the inclination sensor is able to sense the inclination of the electric drill and interrupts a drill drive current.

FIG. 1(C) shows the details of the inclination sensor 10 attached to the mount plane 8 of the inclination sensor, as seen from the side of the worker along the drill axis C. The inclination sensor 10 includes a uniaxial sensor $10x$ capable of sensing an inclination in the X direction and a uniaxial sensor $10y$ capable of sensing an inclination in the Y direction. Preferably, these two uniaxial inclination sensors $10x$ and $10y$ may be connected in series to constitute the inclination sensor 10. Instead of the two uniaxial inclination sensors, one biaxial inclination sensor $10xy$ (not shown) may be used to constitute the inclination sensor 10.

Figure 3:
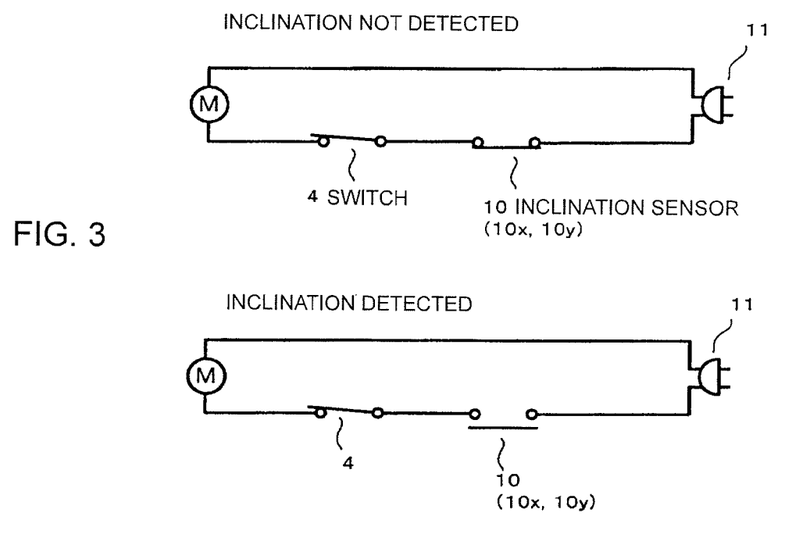
FIG. 3 is a diagram showing an outline of an electric circuit of the electric drill.

FIG. 3 is a diagram showing an electric circuit of the electric drill 1. In the electric drill 1, a rotation drive motor M, an ON/OFF operation switch 4 of this motor M and the inclination sensor 10 are connected in series to AC power obtained from a commercially-available AC power supply plug 11, for example.

The inclination sensor 10 is constantly held in parallel to the surface of the ground when the drill 3 is in the normal state in which the drill 3 is placed on the original rotation axis C. The inclination sensor 10 is configured such that it can turn OFF the drill drive power supply when the inclination sensor senses an inclination greater than a predetermined angle after the electric drill 1 is offset from the original 10 rotation axis C and tilted. This "predetermined angle" can be arbitrarily determined under limitation of sensitivity of the inclination sensor 10.

The inclination sensor 10 may be configured such that, when sensing an inclination greater than the predetermined angle, the inclination sensor 10 turns ON an interrupting circuit (not shown) provided in a drill drive power supply circuit to interrupt a drive current.

How to use the electric drill 1 with the inclination sensor will be described. As shown in FIG. 1(A), a worker presses the tip end of the drill 3 against the part H to be bored of the surface of the workpiece material 7, holds the electric drill by operating the grip portion 5 such that the rotation axis C of the drill 3 is perpendicular to the surface of the workpiece material 7, and then turns ON the switch 4. At that time, the inclination sensor 10 is held in parallel to the surface of the ground. In a like manner, the mount plane 8 of the inclination sensor attached to the inclination sensor 10 also is held in parallel to the surface of the ground.

If the rotation axis C of the drill 3 is not offset (i.e. not inclined) so that the drill 3 is moved along the rotation axis C, then holes can be bored in the workpiece material along the vertical direction to the surface of the workpiece material.

However, as shown in FIG. 2, if the drill 3 is tilted from the original drill rotation axis C to the inclined rotation axis Ca, during the drilling operation, then it is impossible to bore holes in a desired direction. The drill mount plane 8 is prescribed as a plane that is parallel to the surface of the ground and is fixed to the drill body 2. Accordingly, when the drill is tilted, the drill body 2 and the mount plane 8 of the inclination sensor are tilted in unison with each other, the inclination sensor 10 ($10x$, $10y$) attached to the mount plane 8 of the inclination sensor is also tilted to sense this inclination and then the drive current is interrupted. As a consequence, it is possible to prevent holes from being bored in an unexpected direction.

After that, when the worker corrects the inclination of the drill 3 to the vertical direction and brings the drill close to the original drill rotation axis C, the inclination sensor 10 is turned ON so that the worker can resume boring holes. As a result, if the electric drill 1 is tilted during drilling operation, then the drive current is interrupted. If the drill is returned to the proper boring direction, then the drive current is again connected to the electric drill. If the drill is tilted again, then the drive current is interrupted. If the drill is returned to the proper boring direction, the drive current is again connected to the electric drill. Thus, holes can be bored in a desired direction.

Figure 4:
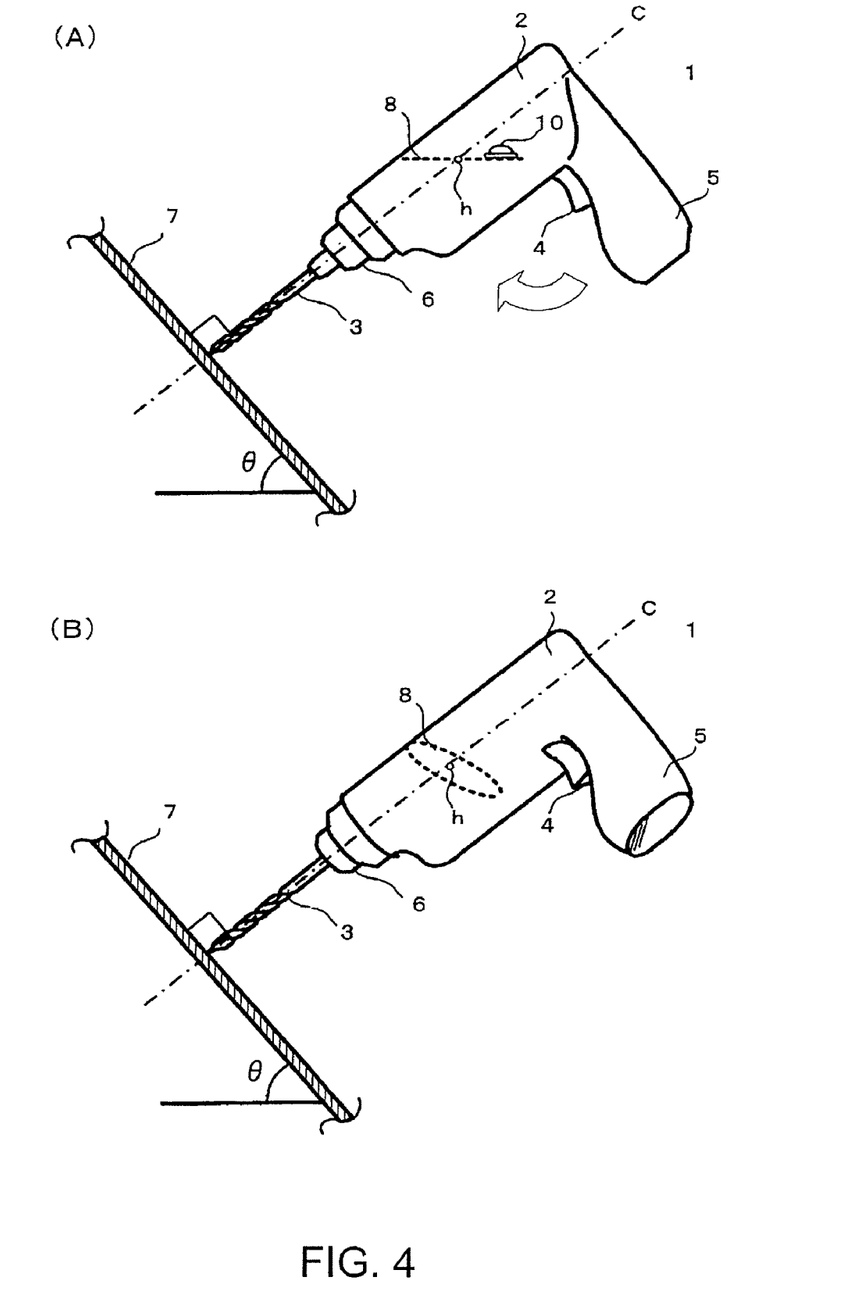
FIG. 4 is a diagram to explain a drill rotating operation done when holes are bored.

Next, a rotation operation of the electric drill will be described. When holes are bored by the electric drill, a worker sometimes wishes to rotate the electric drill around the drill rotation axis C, in order to avoid obstacles and maintain workability. FIG. 4(A) shows a case in which holes are perpendicularly bored to the surface of the workpiece material 7 located at the angle of 0 degree relative to the surface of the ground. At that time, in order to avoid obstacles and to maintain workability, for example, the worker may wish to bore holes with the electric drill 1 that is rotated somewhat around the rotation axis C. FIG. 4B shows a case in which holes are bored with the electric drill 1 that is rotated around the drill rotation axis C at an angle.

When holes are bored in the vertical direction as shown in FIG. 1A, the mount plane 8 of the inclination sensor is positioned in parallel to the surface of the ground. Accordingly, even when the worker rotates the electric drill as with the case of FIG. 4, the drill drive current is not interrupted, because the mount plane 8 of the inclination sensor is rotated around the rotation axis C under the condition that the mount plane 8 held in parallel to the surface of the ground and that the inclination sensor 10 mounted on the mount plane 8 of the inclination sensor is not tilted. That is, when holes are bared in the vertical direction, the worker is able to rotate the electric drill freely.

Second Embodiment

Holes Bored in the Wall (Horizontal Hole)

Figure 5:
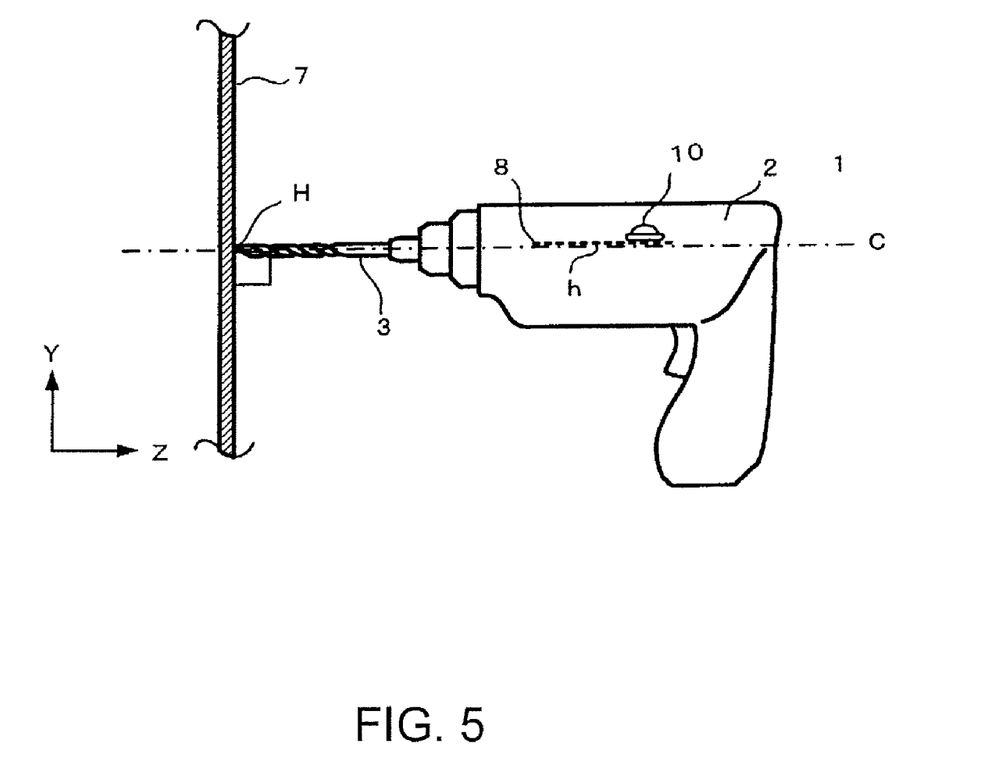
FIG. 5 is a diagram to explain a second embodiment in which holes are bored along the horizontal direction by an electric drill.

FIG. 5 is a diagram to explain a case in which holes are bored in the wall. Specifically, this drawing is used to explain the embodiment in which holes are bored in the workpiece material in the perpendicular direction to the surface of the workpiece material 7 located at a right angle (i.e. θ=90 degrees) relative to the surface of the ground. At that time, the boring direction relative to the surface of the ground is an angle of zero. Also in the case that holes are bored in the horizontal direction as shown in FIG. 5, the inclination sensor 10 is held in parallel to the surface of the ground. Accordingly, the mount plane 8 of the inclination sensor is also positioned in parallel to the surface of the ground.

If the drill 3 is tilted during a drilling operation so that the drill axis is inclined from the original drill rotation axis C to the inclined rotation axis Ca, then it is impossible to bore holes in a desired direction. When the drill is tilted, the drill body 2 and the mount plane 8 of the inclination sensor are tilted in unison with each other, the inclination sensor 10 mounted on the mount plane 8 of the inclination sensor can sense this inclination and then the drive current is interrupted.

After that, when the worker corrects the inclination of the drill 3 to an inclination in the horizontal direction so that the drill can be brought close to the original drill rotation axis C again, the inclination sensor 10 is turned ON so that the worker can resume a boring operation of holes.

When a hole is bored in the horizontal direction, as shown in FIG. 5, the mount plane 8 of the inclination sensor is placed in parallel to the surface of the ground. In this case, a line (intersection line h) on the mount plane 8 of the inclination sensor intersects with the drill rotation axis C. When the worker rotates the drill as with the case in FIG. 4, the mount plane 8 of the inclination sensor rotates around the intersection line h (i.e. drill rotation axis C) to allow the inclination sensor 10 to sense an inclination and then to interrupt the drive current.

Figure 6:
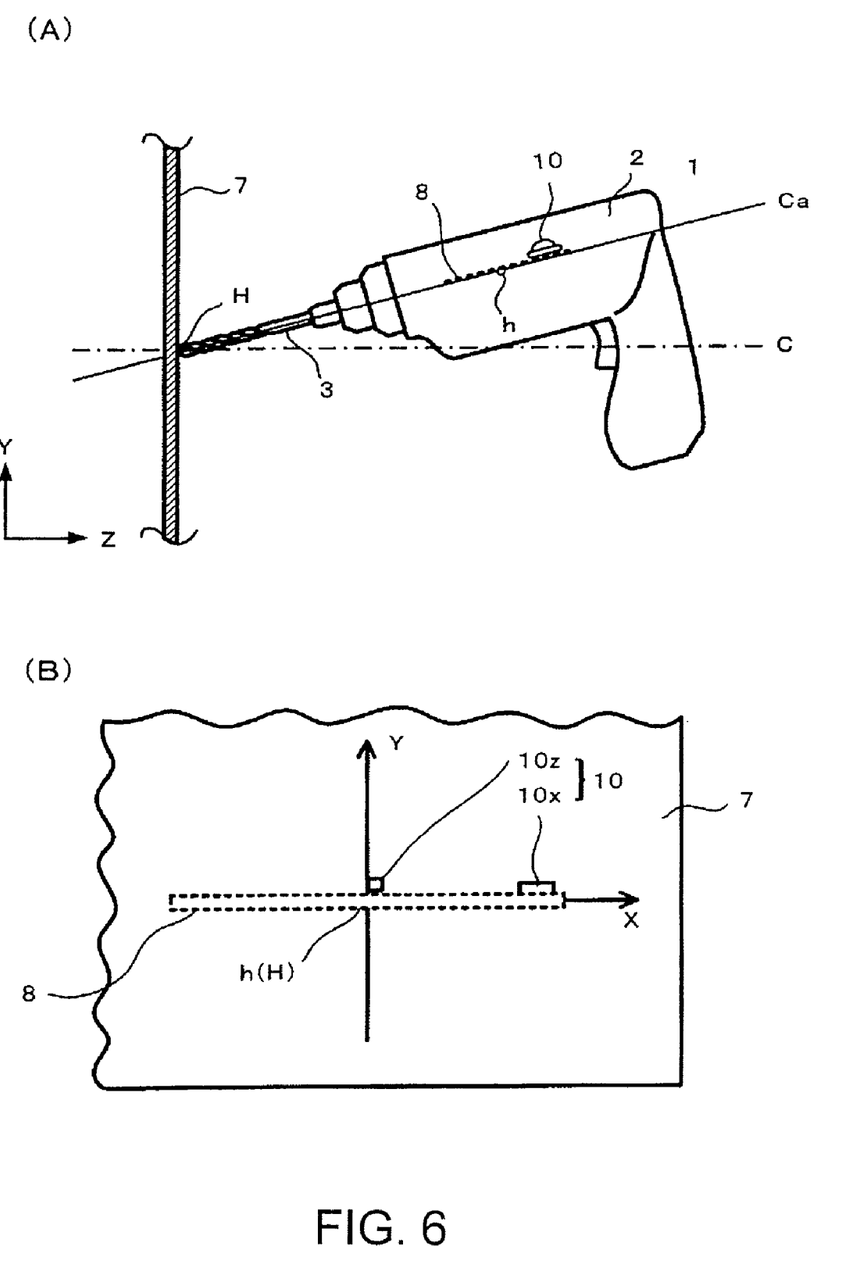
FIG. 6 is a diagram to explain a case in which the electric drill is tilted when holes are bored according to the second embodiment.

FIG. 6(B) is a diagram showing the inclination sensor 10 from the side of the worker along the drill axis C, which inclination sensor is attached to the mount plane 8 of the inclination sensor. In order to avoid the interruption of the drive current when the drill is rotated, the inclination sensor 10 includes only the uniaxial inclination sensor 10x, located along the Z axis. Alternatively, of the two uniaxial inclination sensors 10x and 10y connected in series, the uniaxial inclination sensor 10x located along the X axis is always turned ON, so that the uniaxial inclination sensor 10x can always conduct the drill drive current to the electric drill. Consequently, even when the worker rotates the electric drill in this case, the uniaxial inclination sensor 10z rotates around the rotation axis C (Z axis) so that no inclination of the drill is caused in the Z-axis direction. Accordingly, the drive current can be prevented from being interrupted even when the drill is rotated.

Third Embodiment

Boring Operationin a Workpiece Material in a Direction Perpendicular to the Surface of the Workpiece Material Held at an Arbitrary Angle θ

Figure 7:
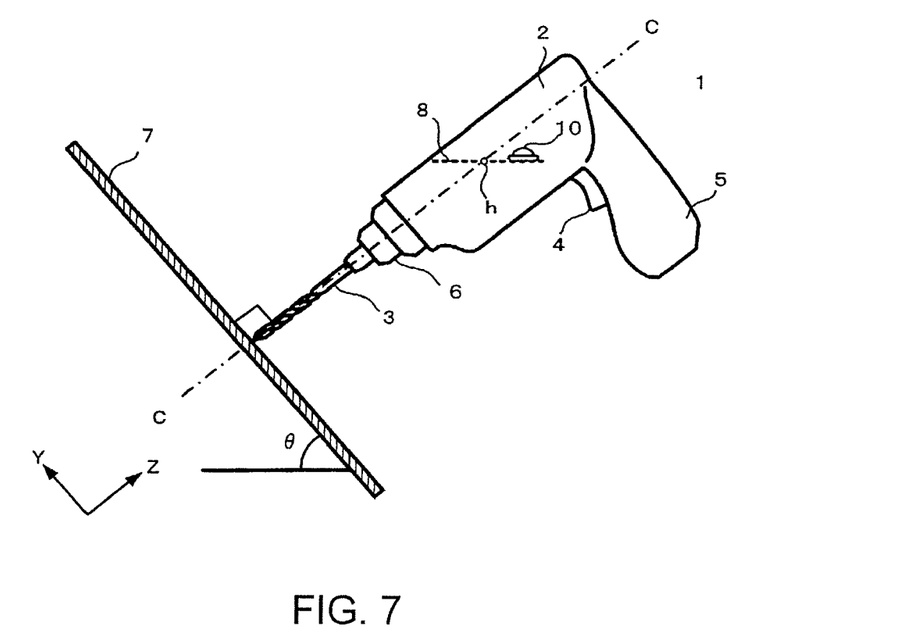
FIG. 7 is a diagram to explain a third embodiment in which holes are bored on a workpiece material located at an angle θ relative to the surface of the ground.

FIG. 7 is a diagram to explain a third embodiment in which holes are bored in the workpiece material 7 located at an angle of 6 degree relative to the surface of the ground by the electric drill 1.

Figure 8:
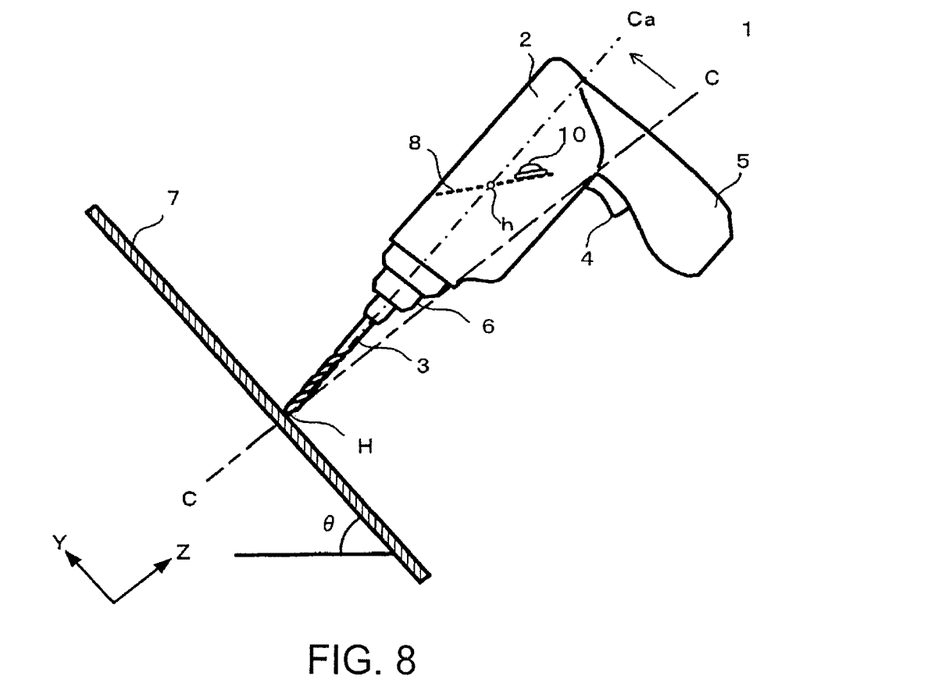
FIG. 8 is a diagram to explain a case in which an electric drill is tilted when holes are bored in the third embodiment of FIG. 7.

If the drill 3 is tilted during a boring operation so that the drill is inclined from the original drill rotation axis C to the inclined rotation axis Ca, as shown in FICA 8, then the worker cannot bore holes in a desired direction. When the drill is tilted, the drill body 2 and the mount plane 8 of the inclination sensor are tilted in unison with each other, the inclination sensor 10 mounted on the mount plane 8 of the inclination sensor senses an inclination, and then the drill drive current is interrupted.

After that, when the worker corrects the inclination of the drill 3 to again bring it close to the original drill rotation axis C, the inclination sensor 10 is turned ON so that the worker can resume boring holes.

The rotation operation in this case will be described. In FIG. 7, the mount plane 8 of the inclination sensor is placed in parallel to the surface of the ground. When the worker rotates and holds the electric drill 1, the mount plane 8 of the inclination sensor secured to the electric drill body is rotated about the rotation axis C in response to this rotation operation and then tilted relative to the surface of the ground. That is, the inclination sensor 10 senses this rotation operation and interrupts the drive current. Accordingly, in the third embodiment, the worker is unable to rotate and operate the electric drill I upon working. When the worker intends to rotate and operate the drill, it is necessary for the worker to make the inclination sensor 10 inactive (drill drive current is always ON) by using a suitable switch (not shown) previously provided.

Fourth Embodiment

A Boring Operation in a Workpiece Material at an Angle a on the Surface of The Workpiece Material Located at an Arbitrary Angle θ

The first to third embodiments show the case in which the boring direction is set to the vertical direction relative to the surface of the workpiece material 7. The case may be generalized as a case in which a hole is bored in the workpiece material 8 at an angle a on the surface of the workpiece material 8 located at an angle θ relative to the surface of the ground will be considered.

Figure 9:
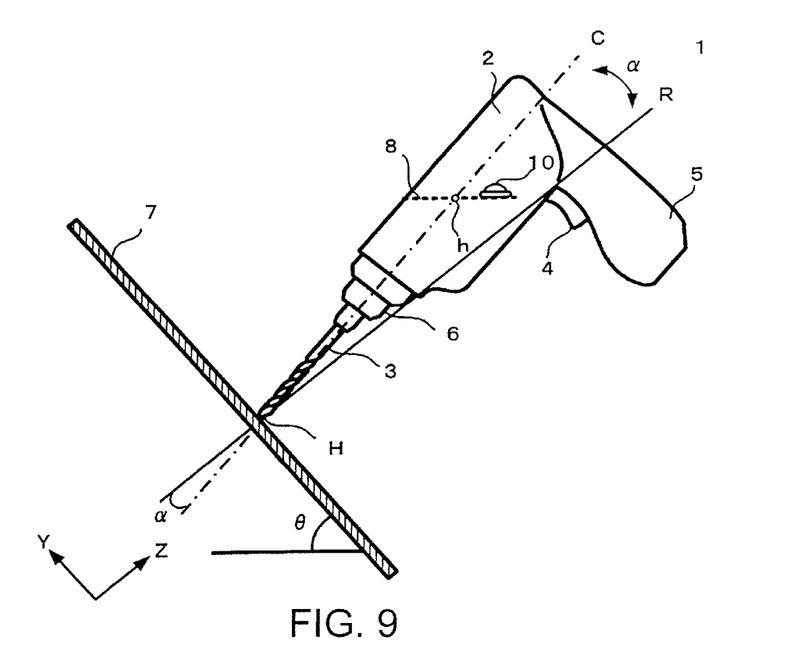
FIG. 9 is a diagram to explain a case in which a boring direction has an angle of a degree relative to the surface of a workpiece material when holes are bored on the workpiece material located at an angle of θ degree relative to the surface of the ground.

In the case, in a normal state, the inclination sensor 10 is held horizontally relative to the surface of the ground. That is, the mount plane 8 of the inclination sensor is set horizontally relative to the surface of the ground. When the drill is tilted out of the original drill rotation axis C, the drill body and the mount plane 8 of the inclination sensor are tilted relative to the surface of the ground in unison with each other, whereby the inclination sensor 10 located on the mount plane 8 of the inclination sensor senses an inclination and then interrupts the drive current.

After that, when the worker again brings the drill close to the original rotation axis C by correcting the inclination of the electric drill 1, the inclination sensor 10 is turned ON so that the worker can resume boring holes.

If the worker rotates the electric drill 1, the mount plane 8 of the inclination sensor is rotated about the rotation axis C and tilted, so that the inclination sensor 10 senses the inclination, thereby interrupting the drive current. That is, the worker is unable to rotate the electric drill.

Fifth Embodiment

Angle Setting Means of Inclination Sensor

The above-described first to fourth embodiments are those which are concerned with the electric drill 1 of which boring direction is fixed. The fifth embodiment is the electric drill 1 that includes an inclination sensor angle setting means 11 and can bore holes solely as with the cases of the first to fourth embodiments.

The mount plane 8 of the inclination sensor in the first to fourth embodiments is an the imaginary plane. In the fifth embodiment, the mount plane 8 of the inclination sensor is replaced with a substantial the mount plane 8-1 of the inclination sensor.

Figure 10:
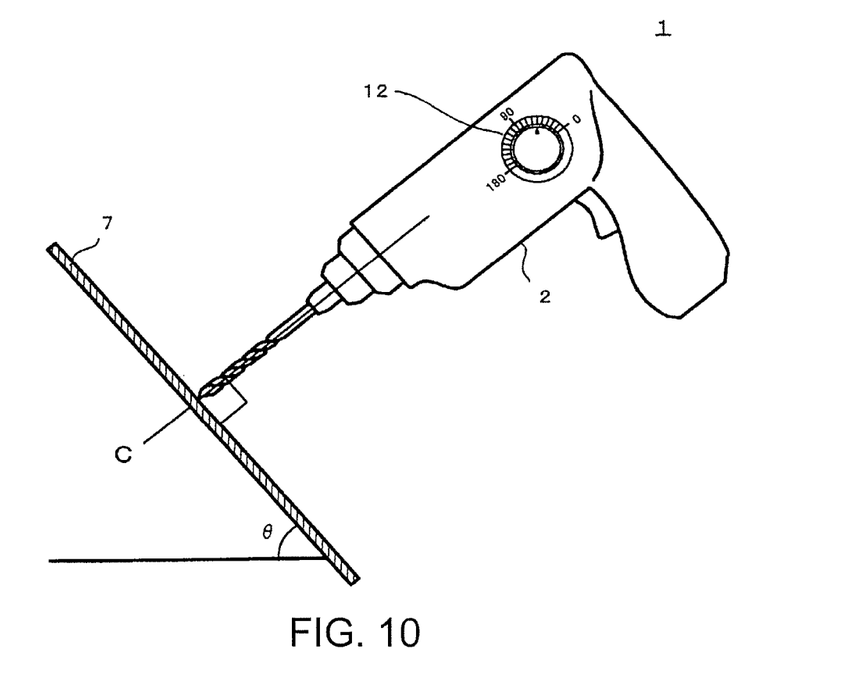
FIG. 10 is a diagram to explain a workpiece surface gradient setting dial attached to the electric drill.

FIG. 10 describes an electric drill I by which holes can be bored perpendicularly to the surface of the workpiece material 7 which is inclined at an arbitrary angle θ. This drill body I includes at its side surface a workpiece surface gradient setting dial 12. A rotation axis d of the workpiece surface gradient setting dial is vertical to the rotation axis C of the drill. The workpiece surface gradient setting dial 12 is set to zero in gradient when the rotation axis C of the drill is vertical to the surface of the ground.

Figure 11:
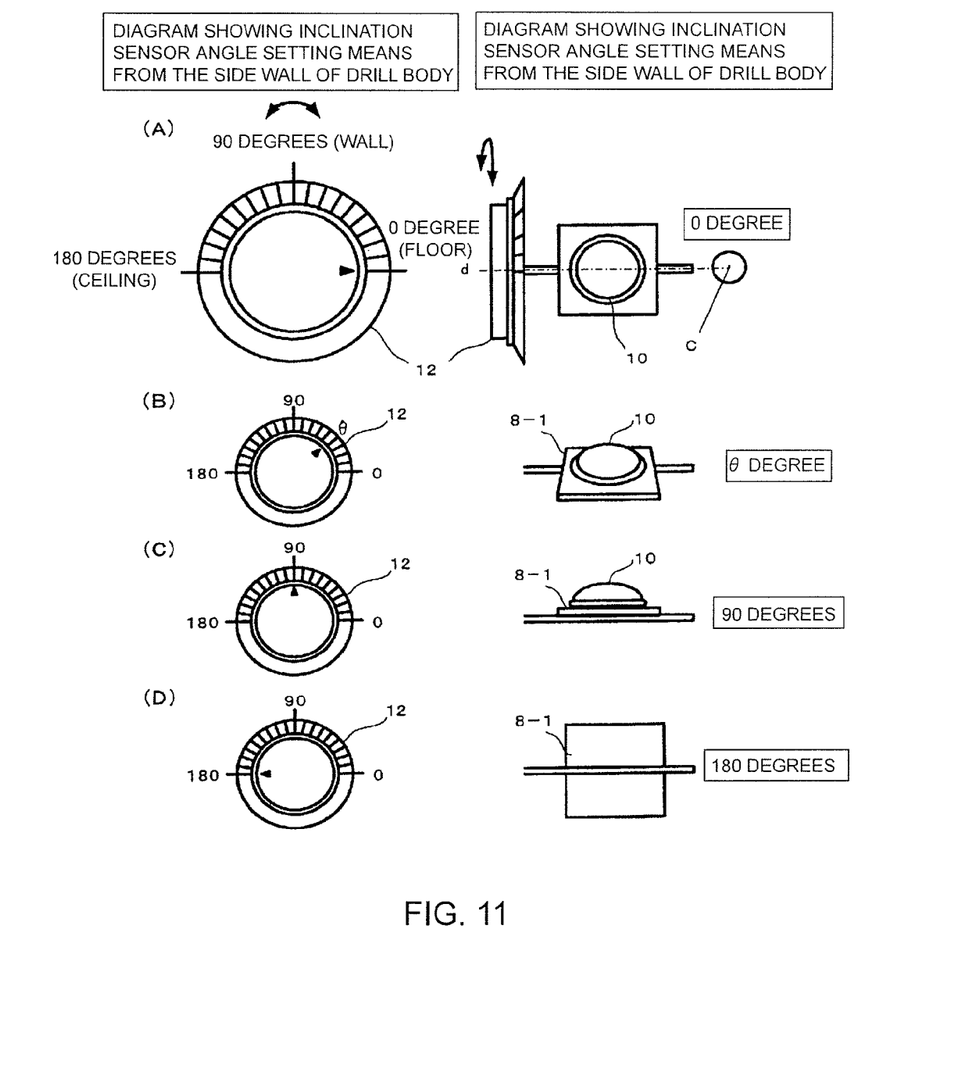
FIG. 11 is a diagram to explain an inclination sensor angle setting means including an angle setting dial located on the side of a drill body and a means for rotating and holding an inclination sensor mount plate at an angle set by the angle setting dial.

FIG. 11 is a diagram to explain the workpiece surface gradient setting dial 12. The left half of FIG. 11 shows the side of the drill body 2 (i.e. it shows the front of the workpiece surface gradient setting dial 12). The right half of FIG. 11 shows the rear of the drill body (i.e. which the worker sees along the drill rotation axis C).

Further, FIG. 11 shows FIGS. 11(A) to 11(D) from the top to the bottom of it. That is, FIG. 11(A) shows a case in which holes are bored in the floor as shown in FIG. 1(A) (at angle θ=zero), FIG. 11(B) shows a case in which holes are bored perpendicularly to the surface of the workpiece material 7 which is tilted at an arbitrary angle θ as shown in FIG. 10 (at angle θ), FIG. 11(C) shows a case in which holes are bored in the wall as shown in FIG. 5 (at angle θ=90 degrees) and FIG. 11 (D) shows a case in which holes are bored in the ceiling as shown by turning the figure of FIG. 1(A) upside down (at angle θ=180 degrees).

In the case that holes are bored perpendicularly to the floor, as shown in FIG. 11A, if the workpiece surface gradient setting dial 12 is set to the angle zero, then the 17 mount plate 8-1 having the inclination sensor 10 is perpendicular to the rotation axis C of the drill 2.

For example, as shown in FIG. 11(B), when the workpiece surface gradient setting dial 12 is rotated 0 degree, the mount plate 8-1 having the inclination sensor 10 is rotated 0 degree about the rotation axis d of the workpiece surface gradient setting dial 12. As a result, when the rotation axis C of the drill is perpendicular to the surface of the workpiece material, the inclination sensor 10 is set to the horizontal state. When the rotation axis C of the drill is tilted from the vertical state relative to the surface of the workpiece material, the inclination sensor 10 senses an inclination and turns OFF the drill drive current to thereby stop rotation of the motor of the electric drill 1.

When the workpiece surface gradient setting dial 12 is provided and the angle θ formed between the workpiece material 7 and the surface of the ground is set as described above, if θ=zero, then holes can be bored perpendicularly into the floor (FIG. 11(A)), if θ is arbitrary, then holes can be bored at an arbitrary angle θ (FIG. 11(B)), if θ=90 degrees, then holes can be bored horizontally into the wall (FIG. 11(C)) and if θ=180 degrees, then holes can be bored perpendicularly into the ceiling (FIG. 11(D)), respectively.

That is, when holes are bored perpendicularly into the floor as shown in FIG. 11(A), the workpiece material 7 is set at an angle of zero relative to the surface of the ground and the drill axis is extended in the vertical direction. Next, when the workpiece material 7 is set at an arbitrary angle θ relative to the surface of the ground, the drill should be tilted such that the drill axis C is inclined the angle θ from the vertical direction, so that holes may be bored perpendicularly into the surface of the workpiece material. Concurrently therewith, the mount plate 8-1 of the inclination sensor inclined the angle θ should be returned the angle θ so that the mount plate 8-1 of the inclination sensor may be put horizontal relative to the surface of the workpiece material. Accordingly, when the workpiece surface gradient setting dial 12 is set to the angle θ, the mount plate 8-1 of the inclination sensor can rotate about the rotation axis d of the workpiece surface gradient setting dial 12. When a hole is bored at the angle α as shown in FIG. 9, if the angle formed by the drill axis relative to the vertical line is set by the workpiece surface gradient setting dial 12, then the mount plate 8-1 of the tilted inclination sensor can be returned to the horizontal state. Thus, the workpiece surface gradient setting dial 12, provided in the electric drill 1, as described above, allows the electric drill 1 to bore holes in the workpiece material 7 placed at an arbitrary angle.

Sixth Embodiment

Inclination Sensor Mount Plate that can be Rotated Relative to the Drill Rotation Axis C As a sixth embodiment, the present invention is to provide an inclination sensor mount plate that can be rotated relative to the drill rotation axis C. The first to fifth embodiments had been explained such that, with respect to other drilling than the cases in which holes are bored in the floor and the ceiling (vertical holes), the worker is unable to rotate the electric drill 1 because the inclination sensor mount plane 10 is tilted.

However, this problem can be solved by making the inclination sensor 10 and the inclination sensor mount plate 8-1 to be rotatable relative to the drill rotation axis C. For example, the inclination sensor 10 and the inclination sensor mount plate 8-1 are formed as an attachment that can be attached to the drill body 2. The attachment is made to be attached to the rear end portion of the drill body 2 in such a manner that it can be rotated relative to the drill rotation axis C (e.g. by a suitable attachment type such as a screw type and an insertion type).

When the electric drill 1 is rotated an angle, if the attachment is then rotated the angle in the reverse direction so that the attachment is returned to the original state, then the inclination sensor mount plate 8-1 can be held parallel to the surface of the ground to enable both the X-direction uniaxial inclination sensor and the Y-direction uniaxial inclination sensor to function. A biaxial inclination sensor may be used instead of the sensors.

Seventh Embodiment

Electric Drill Using Gyro

As a seventh embodiment, the present invention is to provide an electric drill that uses a sensor such as a gyro, a motion sensor, etc., capable of detecting a posture angle, instead of the inclination sensor 10. Various sensors are known as sensors that can detect attitude angles of an installment object. For example, instead of the inclination sensor 10, a 3D motion sensor which is made by combining-Ceramic Gyro 15 (™), an acceleration sensor and a terrestrial magnetism sensor and which is manufactured and distributed by NEC TOKIN CORPORATION at Chiyoda-ku, Tokyo, may be used. Also, a motion control sensor made by combining an acceleration sensor and a terrestrial magnetism sensor and which is manufactured and distributed by AICHI STEEL CORPORATION at Tokai-shi, Aichi-ken, may be used.

Outputs of the sensors are prescribed as a (alpha, yaw angle, Z axis), R (beta, pitch angle, Y axis) and y (gamma, roll angle, X axis). A proper comparator is provided to compare these outputs. If a compared value is greater than an allowable value, then the drive current of the electric drill may be interrupted.

Eight Embodiment

Electric Drill Using Laser Distance Meter

As a seventh embodiment, the present invention is to provide an electric drill that uses a laser distance meter instead of the inclination sensor 10. A laser distance meter is able to accurately measure a distance in a non-contact fashion by using visible light. For example, the electric drill may include three laser distance meters which are located in the X-axis direction, the Y-axis direction and the Z-axis direction to thereby obtain positional data which are produced on a space of the electric drill at the start of boring holes. If these positional data are greater than allowable values when holes are bored, then the drive current of the electric drill is interrupted. Alternatively, the laser distance meter may be located such that a first laser distance meter is positioned at 12 o'clock position, a second laser distance meter is located at 3 o'clock position, a third laser distance meter is located at 6 o'clock position and a fourth laser distance meter is located at 9 o'clock position on a clock face that is assumed to be positioned on a cross-section of the rotational axis of the drill, so that the laser distance meters can measure the distances between the respective laser distance meters and a workpiece material. In this state, the distances are continuously measured since drilling has been started. An inclination of the electric drill may be detected based on a difference between the distances measured by the first and third laser distance meters or a difference between the distances measured by the second and fourth laser distance meters.

While the embodiments of the electric drill with inclination sensor according to the present invention and the embodiments have been mentioned so far, these mentioned embodiments are merely examples and it is to be understood that the present invention is not limited to those mentioned embodiments.

Changes and improvements that can be made by those skilled in the art are within the technical scope of the present invention. The technical scope of the present invention should be determined based on descriptions of the scope of the appended claims.

What is claimed is:

1. An electric drill for boring a hole on a surface of a workpiece material at α degree of a predetermined angle relative to the surface of the workpiece material positioned at θ degree of an arbitrary angle relative to a horizontal plane, comprising:
   an inclination sensor mounted on the electric drill for detecting an inclination of the electric drill relative to the horizontal plane;
   means for positioning the inclination sensor in the horizontal plane at the start of boring the hole; and
   means for interrupting a drill drive current if the inclination sensor detects that a rotation axis of the electric drill is tilted over a predetermined angle relative to a boring direction set at the start of boring the hole.

2. The electric drill according to claim 1, wherein the drill drive current is interrupted if the inclination sensor detects that the rotation axis of the electric drill is tilted over a predetermined angle relative to a boring direction of a vertical direction set at the start of boring the hole, when the processed material is placed in parallel to the horizontal plane (angle θ=zero) and when the boring direction is set to a vertical direction relative to the surface of the processed material (angle α=90 degrees).

3. The electric drill according to claim 1, wherein the drill drive current is interrupted if the inclination sensor detects that the rotation axis of the electric drill is tilted over a predetermined angle relative to a boring direction of the horizontal direction set at the start of boring the hole, when the processed material is set to a vertical direction relative to the horizontal plane (angle α=90 degrees) and when the boring direction is set to a vertical direction relative to the surface of the processed material (angle α=90 degrees).

4. The electric drill according to claim 1, wherein the means for interrupting a drill drive current if the inclination sensor detects that a rotation axis of the electric drill is tilted over a predetermined angle relative to a boring direction set at the start of boring the hole, again continues the drill drive current, if the inclination sensor detects that the rotation axis of the electric drill is returned to fall within the predetermined angle.

5. The electric drill according to claim 1, wherein the means for positioning the inclination sensor in the horizontal plane at the start of boring the hole is an inclination sensor mount plate provided in the electric drill and wherein the inclination sensor mount plate can be positioned to be horizontal at the start of boring the hole.

6. The electric drill according to claim 1, wherein the means for positioning the inclination sensor in the horizontal plane at the start of boring the hole includes a processed surface gradient setting dial and wherein the inclination sensor is positioned by the processed surface gradient setting dial to be horizontal at the start of boring the hole.

7. The electric drill according to claim 1, wherein the means for positioning the inclination sensor in the horizontal plane at the start of boring the hole includes means for rotating and fixing the inclination sensor around the rotation axis of the electric drill.

* * * * *